United States Patent Office 2,829,110
Patented Apr. 1, 1958

2,829,110

BLEACHING AGENT

Homer L. Robson, Lewiston, N. Y., assignor to Olin Mathieson Chemical Corporation, a corporation of Virginia No Drawing. Application August 30, 1952
Serial No. 307,399

4 Claims. (Cl. 252—187)

My invention relates to improved compositions containing calcium hypochlorite and soda ash. More particularly, it relates to compositions containing calcium carbonate in anhydrous crystalline form, which, on addition of the compositions to water, produce sodium hypochlorite solutions which are non-reactive with soaps.

In the prior art of compounding calcium hypochlorite it has long been known that soda ash may be admixed to produce compositions which when dissolved in water result in sodium hypochlorite solutions by precipitation of calcium carbonate. After settling or otherwise removing the precipitated calcium carbonate, the aqueous solution is suitable for bleaching operations in which soaps are used. The sodium hypochlorite solutions may be used, for example, in domestic or commercial washing operations wherein bleaching and washing are simultaneously effected.

The preparation of sodium hypochlorite solutions from calcium hypochlorite and soda ash used as separate reactants or, as described above, previously mixed, requires an irreducible minimum of equipment and a few simple operations. Usually it is necessary to admix calcium hypochlorite and soda ash solutions or to add the previously mixed components to water, stir thoroughly and allow the calcium carbonate to settle. The supernatant clear sodium hypochlorite solution may then be drawn off for use.

Even these few operations require time, equipment and attention which could be avoided if a suitable calcium hypochlorite composition were available which could be added directly to the washing machine. In spite of the presence of soda ash with the calcium hypochlorite, in previously known compositions this combined operation is not feasible. A large part of the calcium is precipitated as calcium carbonate and that product remains suspended in the wash water without affecting the clothes in any way. Calcium soaps, however, are insoluble, and even though a great excess of soda ash is used, a material proportion of calcium is precipitated as undesirable, sticky calcium soap. This effect can be avoided only to a minor degree by allowing the soda ash and calcium hypochlorite to react separately and after 5 minutes, more or less, adding the whole mixture to the soap solution. The hydrous calcium carbonate which is precipitated appears to react to form calcium soap. Thus it has been necessary previously to settle and separate the precipitated calcium carbonate. When settled or otherwise removed, this hydrous calcium carbonate does not interfere with the use of the bleach solution with soap. The unseparated mixture cannot be used satisfactorily.

I have discovered that the addition of a suitable proportion of finely ground, anhydrous crystalline calcium carbonate to calcium hypochlorite-soda ash compositions facilitates the reaction of such compositions in water to produce aqueous sodium hypochlorite solution which is non-reactive with soap even if added to soap solution immediately after its preparation. Although I do not base my invention on any theoretical explanation, I believe the anhydrous crystalline calcium carbonate results in seeding the precipitation of calcium carbonate formed by the reaction of soda ash and calcium hypochorite in an anhydrous crystalline form which is so insoluble that the calcium ion concentration left in solution is not sufficient to precipitate calcium soaps.

Thus my invention provides a calcium hypochlorite-soda ash composition containing an anhydrous crystalline form of calcium carbonate, which when added to water results in an aqueous sodium hypochlorite solution from which calcium carbonate is precipitated in a form so insoluble that the concentration of calcium ions remaining in solution is less than the solubility of calcium soaps. The sodium hypochlorite solution, therefore, does not react with soap solution. Thus the composition of my invention may be added to water and agitated briefly. The whole mixture may be then added to soap solution without any increase in the amount of soap required to give the same amount of suds as if the bleaching composition had not been added. Alternatively, the composition of my invention may be added to a suitable amount of water in a washing machine or laundry wheel, and, after a brief agitation, soap and soiled clothes may be introduced directly.

My invention also provides a process for preparing non-soap reactive aqueous solutions of sodium hypochlorite from calcium hypochlorite and soda ash by adding the latter materials to water with a finely divided anhydrous crystalline calcium carbonate.

Preferably, calcium hypochlorite containing 50% available chlorine content and upwards is used to obtain best results. Such products are described in U. S. Patents 1,481,039, 1,481,040, 1,713,650, 1,713,654, 1,713,668, and 1,713,669. My invention, however, may also be practiced with calcium hypochlorites which are relatively impure and have low available chlorine content such as commercial bleaching powder.

Whiting, a finely ground, natural calcite, makes a very good seed. Aragonite which is 6 to 8% more soluble than calcite, is also useful and causes the precipitation of calcium carbonate in a form which does not react with soap. I have found, however, that it appears to be advantageous to allow a slightly longer time of reaction before admixing the aqueous composition with soap in the case of aragonite in order to insure that all of the calcium is in insoluble and non-reactive form. Other natural or prepared compositions of calcium carbonate containing major proportions of calcite or aragonite may be prepared in finely divided form and are suitable for use in the present invention. Some commercial anhydrous crystalline calcium carbonate contains minor but substantial portions of vaterite, an anhydrous crystalline but relatively soluble form of $CaCO_3$. These may be used, subject to the qualification that the average solubility of the composition should be less than the solubility of calcium soaps so that calcium ions left in solution will not result in precipitation of calcium soaps and that slightly longer time before mixing the solutions should be provided. Compositions containing a major proportion of vaterite are not suitable, as vaterite is far too soluble a form of $CaCO_3$. As a general rule, I have found that anhydrous crystalline calcium carbonate compositions are suitable if their average solubility does not substantially exceed that of aragonite.

Suitable calcite seed may be prepared in situ on the dense ash prior to its admixture with the calcium hypochlorite composition. By addition of a solution of calcium chloride under proper conditions calcite may be formed, and the water added may be removed later by drying instead of following the usual process of hydrating light ash, and calcining to produce dense ash.

In order to insure that all the calcium carbonate is precipitated in the desired non-reactive form it is desirable that the seed be finely divided. I prefer that the seed have a substantial proportion of particles of about 1 to 2 microns in size, although in most preparations a certain fraction will be larger and a smaller fraction may be present. Particles over about 15–25 microns in size are too inactive for the purposes of my invention and require excessive use of calcite. Compositions containing 1 to 5 micron sized particles are most satisfactory for use in the present invention.

For the most advantageous results, about 10% of the calcite seed is added to the calcium hypochlorite-soda ash mixture. The composition when added to water reacts to form calcium carbonate which is substantially all in the form of calcite which does not release its calcium to the soap anions. As little as 1% of calcite seed may be incorporated in the mixture with some improvement in soap consumption, but preferably I use a minimum of about 5% based on the whole composition. Proportions of 50% and upward of calcite seed may be used but I prefer not to exceed about 20% since the composition usually must contain as much hypochlorite as possible in addition to about from 1.5 to 4 times the theoretical amount of soda ash to react with the calcium hypochlorite used. An example of a particularly desirable composition is as follows:

| Component: | Percent by weight |
|---|---|
| Calcium hypochlorite (70% available chlorine) | 13 |
| Soda ash (dense) | 25 |
| Calcite (seed) | 10 |
| Quicklime (desiccant) | 3 |
| Sodium chloride (diluent) | 49 |
| Total | 100 |

The above composition may be added to the wash water to which soap is subsequently added without appreciably increasing the amount of soap required to form adequate suds. The composition may be added directly to suds from synthetic detergents. Because of the excess of soda ash in these compositions they are also suitable for use with hard water where the hypochlorite composition is added to the water in advance of the soap. Hardness in the water is precipitated as desirable non-reactive calcium carbonate with an appreciable saving in soap.

In use, the composition of calcium hypochlorite-soda ash and anhydrous crystalline calcium carbonate is advantageously added to the wash water which has been heated to a suitable wash temperature. This may be as low as about 45° C. when colored clothes are to be washed or more commonly to about 65–70° C. which is usually considered as hot water for washing or laundering. The composition is added to the water in such proportions that about 100 parts per million of available chlorine is present in the batch although any available chlorine content may be introduced as desired.

It is preferable to allow a suitable time of reaction after the addition of the hypochlorite composition and before the addition of soap. Approximately two minutes is a satisfactory time interval but any larger interval may be used if convenient. Improved results may be obtained even if the interval is as small as about 30 seconds. In commercial laundries, ample time may be allowed without appreciably affecting the washing cycle. In domestic washing machines it is convenient to add the appropriate amount of the hypochlorite composition when the introduction of water is commenced. If the soap is then added when all the water is in, a satisfactory period of about 2 minutes for the precipitation to occur is thus provided.

In the following examples one test was carried out using a commercial high test calcium hypochlorite containing 70% of available chlorine. The mixtures used in the following examples which are referred to as compositions A and B had the following compositions:

| Component | Composition A, Percent by Weight | Composition B, Percent by Weight |
|---|---|---|
| Calcium hypochlorite (70% available chlorine) | 13 | 13 |
| Soda ash (dense) | 25 | 25 |
| Calcite (seed) | | 10 |
| Quicklime (desiccant) | 3 | 3 |
| Salt (diluent) | 59 | 49 |
| Total | 100 | 100 |

The soap used in the tests described in the examples was a spray dried soap in bead form. It had a bulk density of about 30 grams per 100 ml. and for convenience was measured by volume.

*Example I*

A domestic automatic washing machine having a water capacity of 30 liters was filled with the normal quantity (about 30 liters) of hard water having 130 parts per million of hardness expressed as calcium carbonate. In order to form satisfactory suds in operation the addition of 85 ml. of the bead form soap was required. The water temperature was 67–70° C. When the same machine was similarly filled with the same water to which was added sufficient of composition A (containing no calcite seed) to produce 100 parts per million of available chlorine, 160 ml. of the same soap was required to give a satisfactory suds. The experiment was repeated, substituting composition B (containing calcite seed according to the present invention) for composition A and only 50 ml. of soap was required to form satisfactory suds.

*Example II*

A similar domestic automatic washing machine was filled with softened water which required only 20 ml. of the bead form soap to produce satisfactory suds. When sufficient high test calcium hypochlorite (70% available chlorine) was added to the soft water to produce 100 parts per million of available chlorine, the quantity of soap required to produce satisfactory suds was 100 ml. When composition B (containing calcite seed according to the present invention) was used with soft water only about 25 to 35 ml. of soap was required to produce satisfactory suds. This is very little above that required in the soft water alone.

*Example III*

Normally soiled clothes were washed in the same automatic machine using 185 ml. of the bead form soap in the first washing. In a second sudsing treatment using fresh hard water, 110 ml. of soap were required to form satisfactory suds. When the experiment was repeated using another batch of soiled clothes but composition A (containing no calcite seed) was added to the second suds to provide 100 parts per million of available chlorine, 170 parts of soap were required. In a further repetition of the experiment, substituting composition B (containing calcite seed according to the present invention), only 80 ml. of soap were required to form satisfactory suds.

Similar results were obtained using soap in other forms.

In the foregoing specification and in the appended claims where I refer to the proportion of calcium carbonate in the compositions as a percentage, I mean percent of the total composition by weight.

I claim:

1. A calcium hypochlorite-soda ash composition in which the soda ash is present in an amount of from about 1.5 to 4 times the theoretical amount to react with the calcium hypochlorite, containing about 1% to about 50% by weight based on the total composition of finely divided anhydrous crystalline calcium carbonate having a solubility not substantially exceeding that of aragonite and being not more than about 25 microns in particle size.

2. A composition according to claim 1 in which the calcium carbonate present is in the form of calcite.

3. A composition according to claim 1 in which the calcium carbonate present is in the form of aragonite.

4. A composition according to claim 1 in which the proportion of finely divided anhydrous crystalline calcium carbonate is between 5% and 20%.

References Cited in the file of this patent

UNITED STATES PATENTS

| | | |
|---|---|---|
| 1,894,207 | Taylor | Jan. 10, 1933 |
| 2,166,363 | MacMahon | July 18, 1939 |
| 2,347,402 | Day | Apr. 25, 1944 |
| 2,506,630 | Bruce | May 9, 1950 |
| 2,538,802 | Schur et al. | Jan. 23, 1951 |
| 2,719,828 | MacMahon | Oct. 4, 1955 |

OTHER REFERENCES

Mellor: "Comprehensive Treatise on Inorganic and Theoretical Chemistry," vol. 3, page 825.